(12) United States Patent
Takabayashi et al.

(10) Patent No.: US 7,523,211 B2
(45) Date of Patent: Apr. 21, 2009

(54) INFORMATION PROCESSING APPARATUS, INFORMATION PROCESSING METHOD, AND COMPUTER-READABLE STORAGE MEDIUM

(75) Inventors: Kazuhiko Takabayashi, Tokyo (JP); Takehiko Nakano, Kanagawa (JP); Yasushi Minoya, Tokyo (JP)

(73) Assignee: Sony Corporation, Tokyo (JP)

( * ) Notice: Subject to any disclaimer, the term of this patent is extended or adjusted under 35 U.S.C. 154(b) by 802 days.

(21) Appl. No.: 11/063,498

(22) Filed: Feb. 23, 2005

(65) Prior Publication Data
US 2005/0198293 A1 Sep. 8, 2005

(30) Foreign Application Priority Data
Feb. 25, 2004 (JP) .............. P2004-049615

(51) Int. Cl.
*G06F 15/16* (2006.01)
(52) U.S. Cl. ............... 709/229; 709/203; 709/217; 709/225
(58) Field of Classification Search ............ 709/203, 709/217, 223, 229, 219, 225
See application file for complete search history.

(56) References Cited

U.S. PATENT DOCUMENTS

| | | | | |
|---|---|---|---|---|
| 5,603,081 | A * | 2/1997 | Raith et al. ............... | 455/435.3 |
| 5,822,434 | A | 10/1998 | Caronni et al. | |
| 6,275,695 | B1 * | 8/2001 | Obhan ........................ | 455/423 |
| 6,308,212 | B1 * | 10/2001 | Besaw et al. ................ | 709/228 |
| 7,003,546 | B1 * | 2/2006 | Cheah ........................ | 709/200 |
| 7,013,303 | B2 * | 3/2006 | Faybishenko et al. ......... | 707/10 |
| 7,035,911 | B2 * | 4/2006 | Lowery et al. ............... | 709/217 |
| 2002/0038348 | A1 * | 3/2002 | Malone et al. ............... | 709/217 |
| 2002/0173981 | A1 * | 11/2002 | Stewart ........................ | 705/1 |
| 2003/0120593 | A1 * | 6/2003 | Bansal et al. .................. | 705/39 |
| 2003/0200234 | A1 * | 10/2003 | Koppich et al. .............. | 707/203 |
| 2004/0117490 | A1 * | 6/2004 | Peterka et al. ............... | 709/229 |
| 2004/0167984 | A1 * | 8/2004 | Herrmann ................... | 709/229 |
| 2004/0168184 | A1 * | 8/2004 | Steenkamp et al. ........... | 725/31 |
| 2004/0250129 | A1 * | 12/2004 | Clough et al. ............... | 713/201 |
| 2005/0021467 | A1 * | 1/2005 | Franzdonk .................... | 705/51 |
| 2005/0066353 | A1 * | 3/2005 | Fransdonk .................... | 725/29 |
| 2006/0021065 | A1 * | 1/2006 | Kamperman et al. .......... | 726/28 |

FOREIGN PATENT DOCUMENTS

| | | |
|---|---|---|
| JP | 10-271154 | 10/1998 |
| JP | 2002-073861 | 3/2002 |

* cited by examiner

*Primary Examiner*—Michael Won
(74) *Attorney, Agent, or Firm*—Finnegan, Henderson, Farabow, Garrett & Dunner, L.L.P.

(57) ABSTRACT

An information-processing apparatus, functioning as a content-utilization management server, includes a storage unit for storing a list of member clients, which are each a client having a right to utilize a content, and a data-processing unit for carrying out a process to register a client on the list of member clients to serve as a member client.

The data-processing unit carries out a process to register a client on the member-client list to serve as a member client on condition that results of confirmation indicate that a client making a request for registration of the client to serve as a member client is a client in the same local network as the content-utilization management server and indicate that a user of the content-utilization management server has given an approval of the requested registration of the client to serve as a member client.

12 Claims, 7 Drawing Sheets

| | APPARATUS IDENTIFICATION NAME (OPTION) | APPARATUS ID | ALLOWED MEMBER REMOVAL TIME INFORMATION |
|---|---|---|---|
| 1 | LIVING-ROOM PC | 080046abcdef | 2004, 0510, 1220 |
| 2 | DINING-ROOM TV | 080046123abc | 2004, 0322, 1112 |
| .. | .. | .. | .. |
| N | | | |
| N+1 | | | |
| .. | | | |

Rows 1..N: LIMIT ON THE NUMBER OF REGISTERED MEMBERS

310 — MEMBER-CLIENT LIST

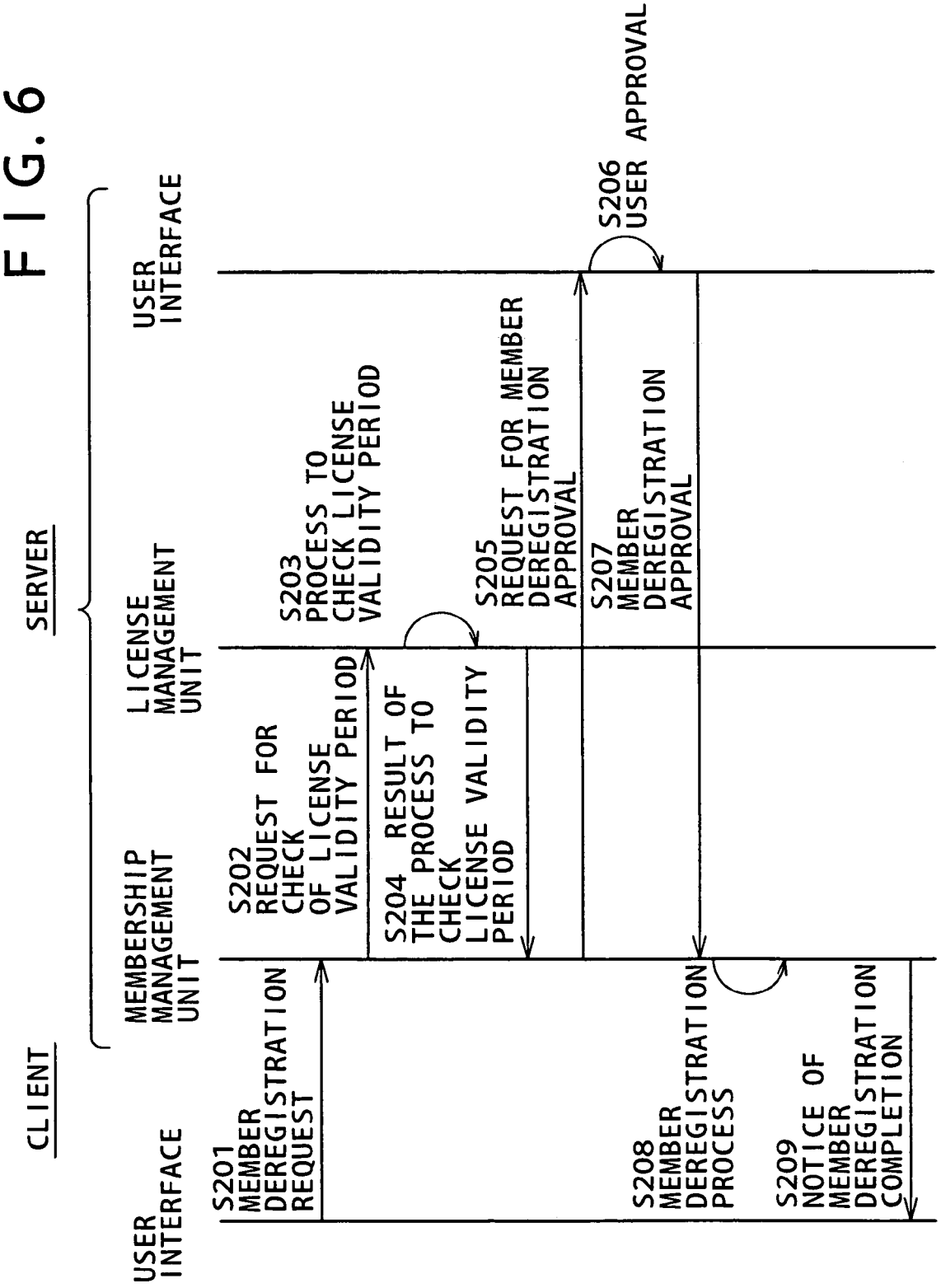

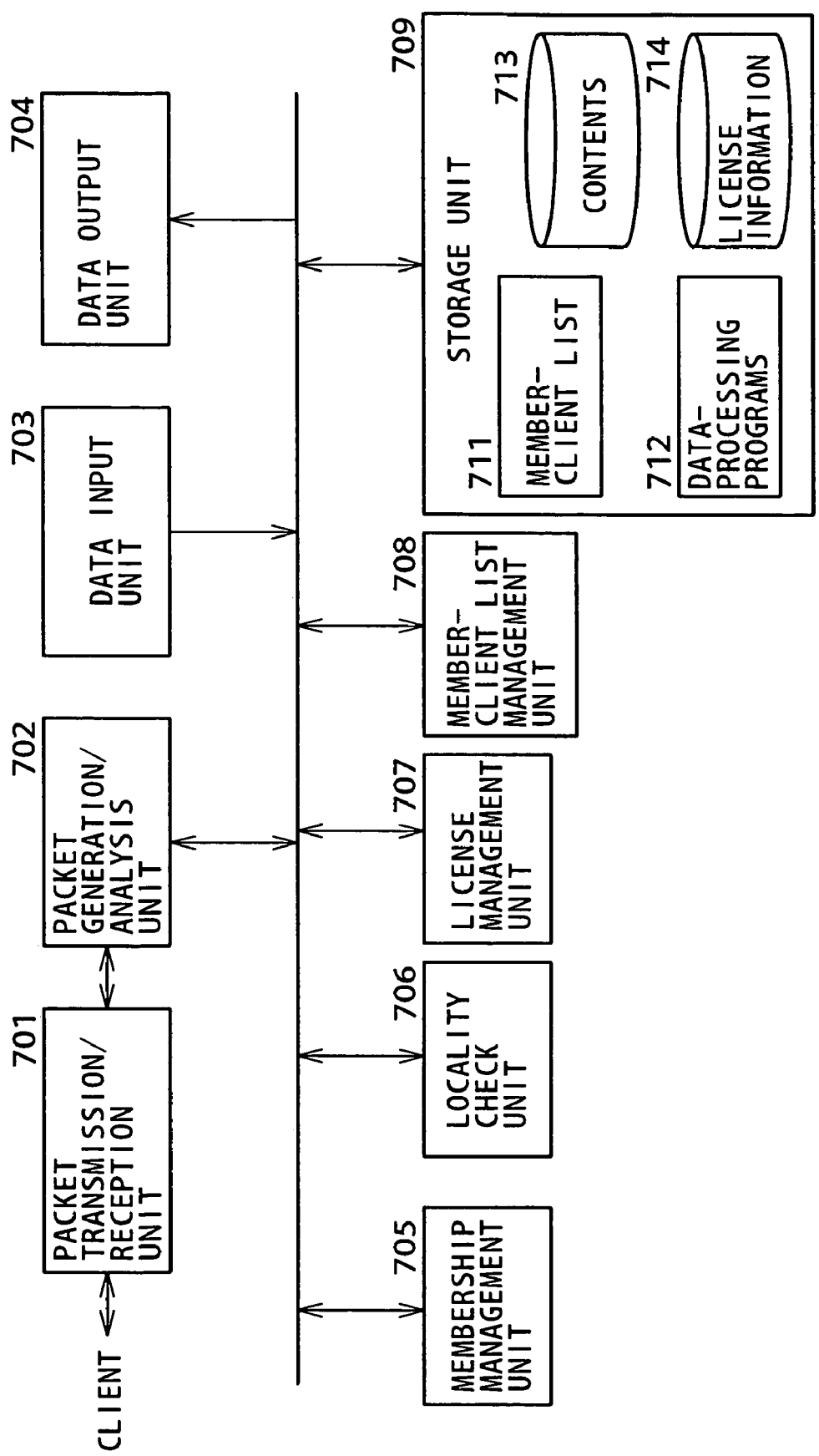

INFORMATION PROCESSING APPARATUS, INFORMATION PROCESSING METHOD, AND COMPUTER-READABLE STORAGE MEDIUM

FIELD OF THE INVENTION

The present invention relates to an information-processing apparatus, an information-processing method, and a computer program. To put it in detail, the present invention relates to an information-processing apparatus, an information-processing method, and a computer program capable of avoiding illegal use of a content stored in a server by carrying out a process to strictly check a client in registration of the client to serve as a member client, which is allowed to utilize the content, and deregistration of the client already serving as a member client in the environment of a local network such as a home network.

BACKGROUND OF THE INVENTION

The popularization of a network referred to as the Internet in recent years has been leading to frequent utilization of the Internet as a network for distributing a variety of digital contents in the form of mainly computer files. In addition, the popularization of a broad-band communication network such as the xDSL (x Digital Subscriber Line), the CATV (Cable TV) and a radio network is also bringing about a prepared state of a mechanism capable of distributing music data, picture data and digital data including electronic print-outs as well as rich contents such as moving pictures to users without stress.

On the other side of the coin, a distributed content is digital data, which can be subjected to illegal operations such as copying and interpolation with ease. In addition, the illegal operations such as operations to copy and interpolate contents are carried out frequently nowadays. Thus, the illegal operations are a main cause of damaging profits of digital-content vendors. As a result, a vicious cycle occurs as an economical phenomenon in which the prices of the contents must be raised but high prices of digital contents are inevitably a popularization barrier, which requires that the prices be increased further.

For example, in recent years, technologies such as the computer and network technologies have been deeply penetrating ordinary homes. A variety of home information appliances at a home is connected to each other through a home network. Examples of the home information appliances are information apparatus such as personal computers and PDAs (Personal Digital Assistants) as well as television receivers and video reproduction apparatus. In addition, in many cases, such a home network is also connected through a router to an external wide-area network represented mainly by the Internet. First of all, a content acquired legally from an external server on the Internet is stored in an internal server provided at a home as a server connected to the home network. The internal server provided at a home as a server connected to the home network is referred to hereafter as a home server. Then, the content is distributed to another terminal provided at the home by way of the home network. The other terminal provided at the home is referred to as a client.

A copyright law protects a content as a copyrighted work against illegal use such as copying and interpolation of the content. On the other hand, the copyright law allows an authorized user of a copyrighted work to copy the work for the purpose of using the copy privately or the purpose of using the copy within a limited domain conforming to private use, use at a home or other similar use. For details, refer to Article 30 of the copyright law.

When the range of the private use is applied to the home network described above, a client terminal connected to the home network is assumed to be a terminal used privately or used in the domain of the home. Thus, one generally considers that a content acquired legally in the home server can be used with a high degree of freedom by any terminal connected to the home server. Of course, it is necessary to limit the number of terminals allowed to receive a content to a predetermined value.

It is difficult, nevertheless, to utilize the contemporary technology to determine whether a terminal logged in to the home network uses a content in the domain of private use.

Assume for example that the home network is connected to an external network through a router in a connection based on an IP protocol. In this case, for the home network, it is difficult to clearly determine the actual location of a client making an access to the home server. If the home server provides a content to a remote or external terminal making an access to the content, the utilization of the content becomes all but unrestricted. The unrestricted utilization of the content is equivalent to a state of giving no protection to the copyright for the content. As a result, the author of the content loses the eagerness to create further contents.

In addition, if the home server uniformly allows all client terminals connected to the home network to utilize a content, a client terminal may log in to a plurality of home networks at different times so that contents can be utilized all but exhaustedly.

If severe restriction is applied to client terminals, on the other hand, the user can no longer surely enjoy content private utilization, which is naturally allowed by the copyright law. As a result, the user cannot receive contents well. In such a situation, the utilization of services provided by the home server to distribute contents are obstructed so that the content-business development itself is hindered.

Looking at the fact that the user normally purchasing a copyrighted work is allowed to utilize the work with a high degree of freedom, for example, the user may utilize information acquired from the network by copying the information. In this case, there has been proposed a method of easily obtaining understanding from a person holding the copyright of a content. For details of the method, refer to Japanese Patent Laid-open No. 2002-73861. However, the method classifies users in accordance with levels of relations between the users and owners of copyrights of information and the information is distributed by adoption of a distribution method, which varies in dependence on the levels of relations. Thus, the proposed method is not a method to determine how far the domain of the private use covers locations in the network.

As a protocol serving as the base of a home network nowadays, for example, a UPnP (a trademark) is known. In accordance with the UPnP, a network can be constructed with ease without carrying out complicated operations, and a service of providing contents to users can be rendered without carrying out cumbersome operations and with no settings between apparatus connected to the network. In addition, the UPnP has merits that the protocol is independent of the OS (Operating System) and an apparatus can be added with ease.

In the UPnP, a definition file prescribed in an XML (extensible Markup Language) format is exchanged between apparatus connected to the network in order for the apparatus to authenticate each other. An outline of pieces of processing for the UPnP is explained as follows.

(1): Addressing processing: A device ID used for identifying a device itself is acquired. An example of the device ID of an apparatus is an IP address assigned to the apparatus.
(2): Discovery processing: The network is searched for devices (apparatus) and information included in a response received from every device is acquired. Examples of the information are a device type and device functions.
(3): Service request processing: On the basis of the information acquired in the discovery processing, every device is requested to render a service.

By execution of such a processing procedure, a service applying an apparatus (device) connected to the network can be provided and received. An apparatus newly connected to the network acquires a device ID by carrying out the addressing processing and acquires information on other devices connected to the network by carrying out the discovery processing. Thus, a request for a service can be made.

A content stored in the home server can be accessed by another apparatus connected to the home network. For example, an apparatus executing the UPnP is capable of acquiring a content. If the content is video or audio data, as an apparatus connected to the home network, a TV, a player or the like is capable of acquiring the movie or the music to be enjoyed by the user.

Even for an apparatus connected to the home network, however, it is necessary to consider a measure for coping with illegal accesses to contents. This is because the contents stored in the home server can be contents requiring management of copyrights. Examples of such contents are a private content and a pay content.

An access made by an apparatus of a user owning a license or a right to utilize a content as an access to the content is naturally permitted. In an environment of a home network connected to an external network through a home router, however, it is quite within the bounds of possibility that a user having no license is capable of entering the home network.

In order to get rid of an illegal access, for example, a home server keeps a list of clients each allowed to make an access to the server. Every time a client makes an access to the home server, the client is collated with those on the list. In this way, an access made by a client not on the list can be rejected.

MAC (Media Access Control) address filtering is known as a typical technique to get rid of an illegal access. A MAC address is a physical address assigned to every communication apparatus as an address unique to the apparatus. A list of MAC addresses of apparatus allowed to make accesses to a home network is created as a list used in the MAC address filtering. In accordance with the MAC address filtering, a list of MAC addresses of apparatus allowed to make accesses to a home network is stored in a rooter or a gateway in advance. The rooter or the gateway separates an internal network (or a sub-network) such as the home network from an external network. Then, when a packet representing an access is received, a MAC address included in the packet is compared with MAC addresses put on the list. An access made by an apparatus having a MAC address not registered on the list in advance is turned down. It is to be noted that a technology of this type is described in documents such as Japanese Patent Laid-open No. Hei 10-271154.

In order to carry out a process to register MAC addresses for restricting accesses, however, it is necessary for an operator to obtain MAC addresses of all apparatus connected to the network and enter the addresses to be registered on a list. In addition, typically, every MAC address has a size of 48 bits. For a general user, such a process is a burden. Thus, it is not practical to request the user to create a list of MAC addresses and store the list in a memory.

A process to add a new apparatus to a home network is carried out frequently. If the user must obtain the MAC address of a new apparatus each time a process to add the new apparatus to a home network is carried out, the easiness to construct the network is obstructed.

On the other side, with the popularization of the network such as the radio LAN, an apparatus having a communication function is capable of intruding into the radio LAN from the outside of the LAN with ease. In the environment of such a network, an illegal access to an apparatus connected to the network can be made more easily and, in addition, it is more and more quite within the bounds of possibility that illegitimate processes such as exploitation of secret information obtained through an illegal access and an illegal operation to fetch a content are carried out. In such a situation, there is raised a demand for easy implementation of a configuration for controlling accesses without causing a load to be borne by the general user.

SUMMARY OF THE INVENTION

It is thus an object of the present invention, which addresses the problems described above, to provide an information-processing apparatus, an information-processing method, and a computer program allowing an access control configuration to be constructed with ease and with a high degree of precision without imposing a burden on the user owning an apparatus connected to a network in a system including a variety of apparatus connected to each other by the network and capable of executing strict management of clients to avoid illegal use of a content stored in a server by carrying out a predetermined process to check a client in registration of the client to serve as a member client, which is a client allowed to utilize the content, and deregistration of the client already serving as a member client in the environment of a local network such as a home network.

In accordance with a first aspect of the present invention, there is provided an information-processing apparatus functioning as a content-utilization management server. The information-processing apparatus includes a storage unit for storing a list of member clients, which are each a client having a right to utilize a content, and a data-processing unit for carrying out a process to register a client on the list of member clients to serve as a member client.

The data-processing unit carries out a process to register a client on the member-client list to serve as a member client on condition that results of confirmation indicate that a client making a request for registration of the client to serve as a member client is a client in the same local network as the content-utilization management server and indicate that a user of the content-utilization management server has given an approval of the requested registration of the client to serve as a member client.

In addition, in the configuration of an implementation of the information-processing apparatus provided by the present invention as described above, the data-processing unit has a locality check unit for confirming locality of a client making a request for registration of the client to serve as a member client by verification of the existence of the client in the same local network as the content-utilization management server on the basis of a MAC address included in a packet received from the client as a MAC address of a transmission source.

In addition, in the configuration of an implementation of the information-processing apparatus provided by the present invention as described above, the data-processing unit determines whether or not the user of the content-utilization management server has given an approval of the requested registration of the client to serve as a member client on the basis of existence or non-existence of a user input entered via a user interface.

In addition, in accordance with a second aspect of the present invention, there is provided an information-processing apparatus functioning as a content-utilization management server. The information-processing apparatus includes a storage unit for storing a list of member clients, which are each a client having a right to utilize a content, and a data-processing unit for carrying out a process to delete a client already serving as a member client from the list of member clients.

The data-processing unit carries out a process to delete a client already serving as a member client from the list of member clients on condition that two results of confirmation indicate that a client making a request for deletion of the client already serving as a member client is a client having no license with a remaining validity time period and indicate that a user of the content-utilization management server has given an approval of the requested deletion of the client already serving as a member client.

In addition, in accordance with an implementation of the information-processing apparatus provided by the present invention as described above, the list of member clients is a list including an allowed member deletion time of each member client as a time indicating a time limit of a validity time period of a license granted to the member client. Further, the data-processing unit includes a license management unit for determining whether or not a client making a request for deletion of the client already serving as a member client is a client having no license with a remaining validity time period on the basis of an allowed member deletion time included in the list of member clients as the allowed member deletion time for the client.

In addition, in the configuration of an implementation of the information-processing apparatus provided by the present invention as described above, the data-processing unit determines whether or not the user of the content-utilization management server has given an approval of the requested deletion of the client already serving as a member client on the basis of existence or non-existence of a user input entered via a user interface.

In accordance with a third aspect of the present invention, there is provided an information-processing method for carrying out a process of registering a client to serve as a member client on a list of member clients each having a right to use a content. The information-processing method includes:

a step of receiving a request for registration of a client to serve as a member client on the list of member clients from the client;

a locality confirmation step of confirming that the client making the request for registration of a client to serve as a member client on the list of member clients is a client in the same local network as a server;

a user-approval confirmation step of confirming an approval given by a user of the server as an approval of the registration of a client to serve as a member client on the list of member clients; and a registration step of registering the client to serve as a member client on the list of member clients on condition that a confirmation result obtained at the locality confirmation step indicates that the client making a request for registration of the client to serve as a member client is a client in the same local network as the server and a confirmation result obtained at the user-approval confirmation step indicates that the user has given an approval of the requested registration of the client to serve as a member client.

In addition, in accordance with an implementation of the information-processing method provided by the present invention as described above, at the locality confirmation step, locality of a client making a request for registration of the client to serve as a member client is confirmed by verification of the existence of the client in the same local network as the server on the basis of a MAC address included in a packet received from the client as a MAC address of a transmission source.

In addition, in accordance with an implementation of the information-processing method provided by the present invention as described above, the user-approval confirmation step is executed to carry out a process of confirming an approval given by the user as an approval of the registration of a client to serve as a member client on the list of member clients on the basis of existence or non-existence of a user input entered via a user interface.

In accordance with a fourth aspect of the present invention, there is provided an information-processing method for carrying out a process of deleting a client already serving as a member client from a list of member clients each having a right to use a content. The information-processing method includes:

a step of receiving a request for deletion of a client already serving as a member client from the list of member clients from the client;

a license confirmation step of confirming that the client making the request for deletion of a client already serving as a member client from the list of member clients is a client having no license with a remaining validity time period;

a user-approval confirmation step of confirming an approval given by a user of the server as an approval of the deletion of a client already serving as a member client from the list of member clients; and a deletion step of deleting the client already serving as a member client from the list of member clients on condition that a confirmation result obtained at the license confirmation step indicates that the client making a request for deletion of the client already serving as a member client is a client having no license with a remaining validity time period and a confirmation result obtained at the user-approval confirmation step indicates that the user has given an approval of the requested deletion of the client already serving as a member client.

In addition, in accordance with an implementation of the information-processing method provided by the present invention as described above, the list of member clients is a list including an allowed member deletion time of each member client as a time indicating a time limit of the validity time period of the license granted to the member client. Further, the license confirmation step is executed to carry out a process of confirming that the client making the request for deletion of a client already serving as a member client from the list of member clients is a client having no license with a remaining validity time period on the basis of an allowed member deletion time included in the list of member clients as the allowed member deletion time for the client.

In addition, in accordance with an implementation of the information-processing method provided by the present invention as described above, the user-approval confirmation step is executed to carry out a process of confirming an approval given by the user as an approval of the deletion of a client already serving as a member client from the list of member clients on the basis of existence or non-existence of a user input entered via a user interface.

In accordance with a fifth aspect of the present invention, there is provided a computer program to be executed for carrying out a process of registering a client to serve as a member client on a list of member clients each having a right to use a content. The computer program includes:

a step of receiving a request for registration of a client to serve as a member client on the list of member clients from the client;

a locality confirmation step of confirming that the client making the request for registration of a client to serve as a member client on the list of member clients is a client in the same local network as a server;

a user-approval confirmation step of confirming an approval given by a user of the server as an approval of the registration of a client to serve as a member client on the list of member clients; and a registration step of registering the client to serve as a member client on the list of member clients on condition that a confirmation result obtained at the locality confirmation step indicates that the client making a request for registration of the client to serve as a member client is a client in the same local network as the server and a confirmation result obtained at the user-approval confirmation step indicates that the user of has given an approval of the requested registration of the client to serve as a member client.

In accordance with a sixth aspect of the present invention, there is provided a computer program to be executed for carrying out a process of deleting a client already serving as a member client from a list of member clients each having a right to use a content. The computer program includes:

a step of receiving a request for deletion of a client already serving as a member client from the list of member clients from the client;

a license confirmation step of confirming that the client making the request for deletion of a client already serving as a member client from the list of member clients is a client having no license with a remaining validity time period;

a user-approval confirmation step of confirming an approval given by a user as an approval of the deletion of a client already serving as a member client from the list of member clients; and a deletion step of deleting the client already serving as a member client from the list of member clients on condition that a confirmation result obtained at the license confirmation step indicates that the client making a request for deletion of the client already serving as a member client is a client having no license with a remaining validity time period and a confirmation result obtained at the user-approval confirmation step indicates that the user has given an approval of the requested deletion of the client already serving as a member client.

It is to be noted that the computer programs are each a program that can be presented to typically a computer system capable of executing a variety of program codes. The computer programs are presented to the computer system by storing the programs in a recording medium such as CD, an FD and an MO or by downloading the programs through a communication medium such as a network in the form readable to the computer system. By presenting or downloading the programs to the computer system in the form readable to the computer system, the computer system is capable of carrying out pieces of processing corresponding to the programs.

Other objects of the present invention as well as its characteristics and its merits will probably become apparent from the following detailed description of preferred embodiments of the present invention with reference to accompanying diagrams. It is to be noted that the technical term "system" used in this specification means the configuration of a logical confluence comprising a plurality of apparatus, which are not necessarily accommodated in the same housing.

In accordance with a configuration of the present invention, a server carries out a process to register a client to serve as a member client on a list of member clients, which are each a client having a right to utilize a content, on condition that two results of confirmation indicate that a client making a request for registration of the client to serve as a member client is a client in the same local network as the server and indicate that a user of the server has given an approval of the requested registration of the client to serve as a member client. Thus, the server turns down a request for registration of a client to serve as a member client on the list of member clients if the request is based on an access made by a client outside the same home network as the server or the request is not approved clearly by the user. As a result, strict management of members can be executed. In addition, the utilization of a content is limited to a client in the same local network as the server, and it is therefore possible to get rid of illegal utilization of a content.

In addition, in accordance with a configuration of the present invention, a server carries out a process to delete a client already serving as a member client from a list of member clients, which are each a client having a right to utilize a content, as a member on condition that two results of confirmation indicate that the client making a request for deletion of the client already serving as a member client is a client having no license with a remaining validity time period and that a user of the server has given an approval of the requested deletion of the client already serving as a member client. Thus, the present invention turns down a request for deletion of a client already serving as a member client from the list of member clients if the request is based on an access made by a client having a license with a remaining validity time period or the request is not approved clearly by the user. As a result, strict management of members can be executed and the utilization of a content is limited to a member client recognized by the server, and it is therefore possible to get rid of illegal utilization of a content.

BRIEF DESCRIPTION OF THE DRAWINGS

FIG. 6 is an explanatory diagram showing a sequence of processes to deregister a client already serving as a member client; and FIG. 7 is a block diagram showing the functional configuration of the server.

DETAILED DESCRIPTION OF THE PREFERRED EMBODIMENTS

An information-processing method, an information-processing apparatus and a computer program, which are provided by the present invention, are explained in detail by referring to diagrams as follows.

Figure 1:
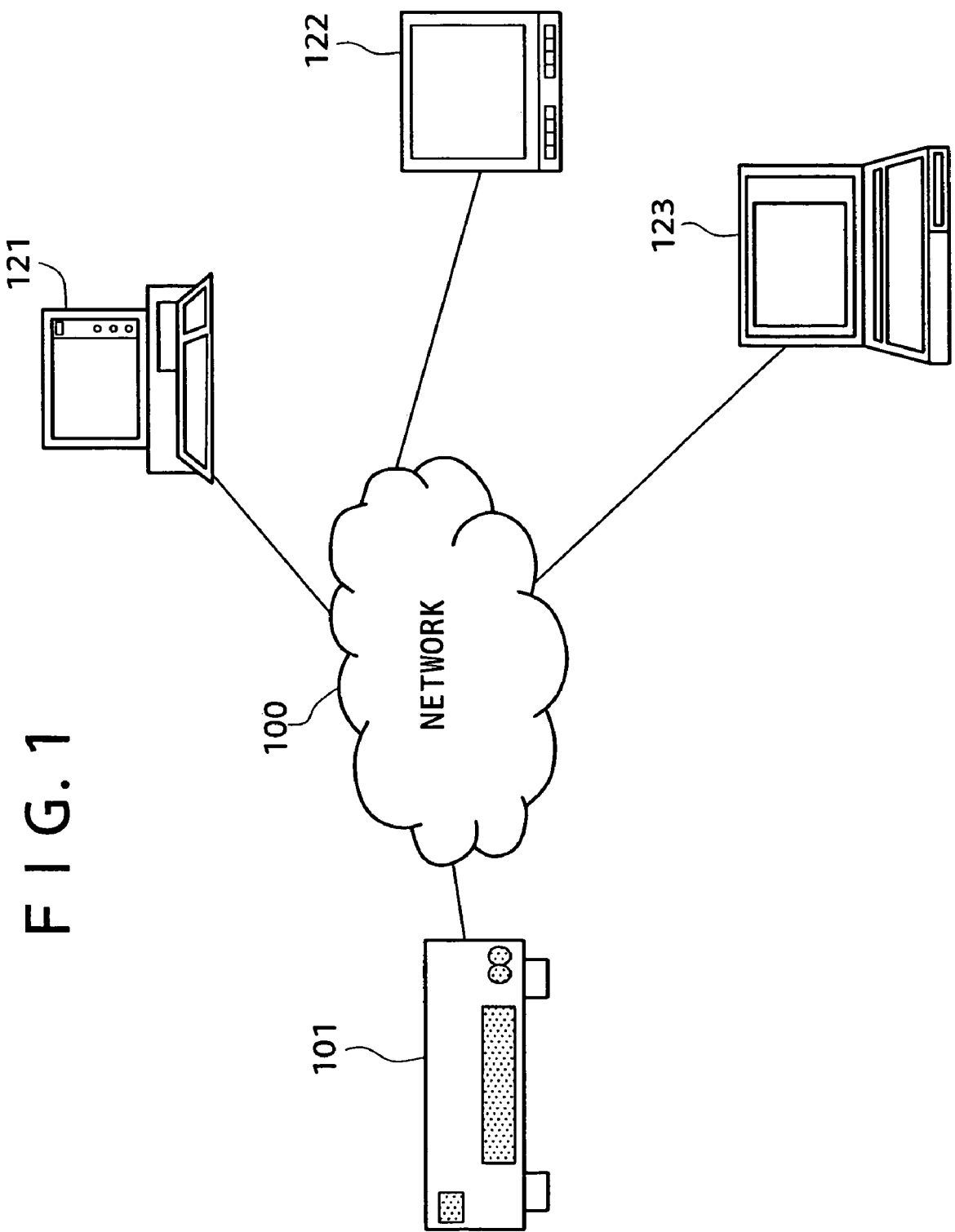
FIG. 1 is a diagram showing a typical configuration of a network to which the present invention can be applied.

First of all, a typical configuration of a network, to which the present invention can be applied, is explained by referring to FIG. 1. As shown in FIG. 1, the configuration of the network comprises a server 101, a personal computer (PC) 121, a monitor 122 and another PC 123, which are connected to each other by a network 100. The server 101 carries out processing in accordance with a variety of processing requests such as a request received from a client apparatus as a request for acquisition of a content. The PC 121 functions as a client apparatus issuing a request for processing to the server 101. An example of the network shown in the figure is a home network. The client apparatus can also be any of a plurality of electronic apparatus or any of a plurality of electric home appliances.

Processing carried out by the server 101 in accordance with requests made by clients connected to the network 100 used as a home network includes a process to provide a client with a content stored in a storage unit such as a hard disk employed in the server 101 and a data-processing service rendered by execution of an application program executable by the server 101. In the configuration shown in FIG. 1, the server 101 is shown by being deliberately distinguished from the client apparatus. It is to be noted, however, that a server is defined as an apparatus for rendering services to clients in accordance with requests made by the clients. Thus, any client apparatus providing its own data-processing service to another client apparatus can be regarded as a server. That is to say, such a client apparatus connected to the network 100 shown in FIG. 1 is also capable of functioning as a server.

The network 100 can be a wire or radio network. Apparatus connected to the network 100 exchange communication packets such as Ethernet (a trademark) frames by way of the network 100. That is to say, a client can request the server 101 to carry out processing of data by transmitting an Ethernet frame including information on a request for the processing of data in a data portion of the frame to the server 101. Receiving the request for the processing of data, the server 101 caries out the processing of data and, if necessary, transmits a result of the data processing to the client by storing the result in the data portion of a communication packet.

An apparatus connected to the network 100 is typically an apparatus conforming to the UPnP. Thus, a new apparatus can be added to the network 100 with ease and an existing apparatus can be detached from the network 100 easily as well. An apparatus newly added to the network 100 can receive a service rendered by another apparatus connected to the network 100 by execution of the following processing procedure:

(1): Addressing processing to acquire a device ID used for identifying the apparatus itself. An example of the device ID of an apparatus is an IP address assigned to the apparatus.
(2): Discovery processing to search the network 100 for devices (apparatus) and acquire information included in a response received from every apparatus. Examples of the information are a device type (apparatus type) and device functions (apparatus functions).
(3): Service request processing to request another device (apparatus) to render a service on the basis of the information acquired in the discovery processing.

Figure 2:
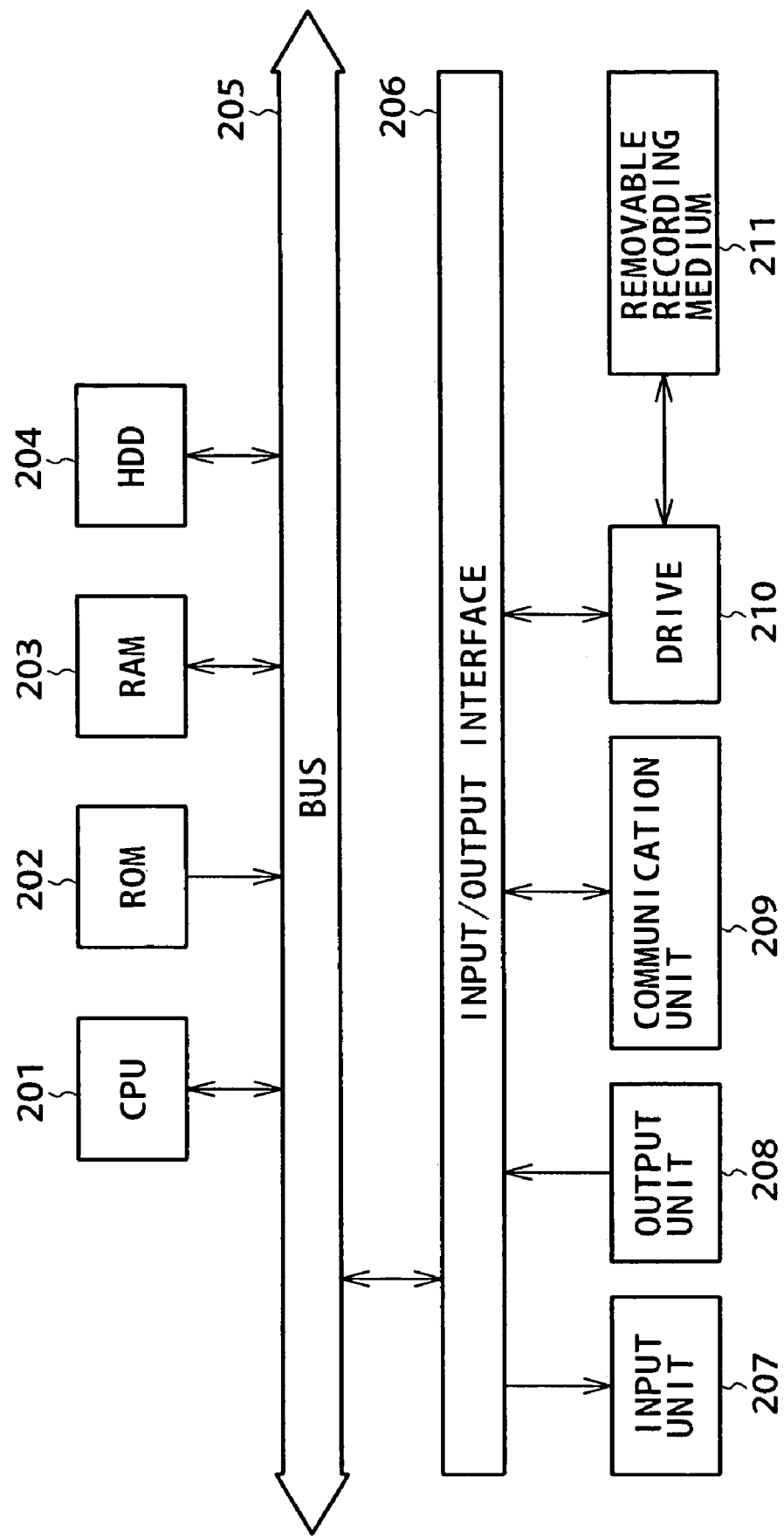
FIG. 2 is an explanatory diagram showing a typical configuration of an apparatus connected to the network.

A typical hardware configuration of a PC is explained by referring to FIG. 2. The PC functions as the server 101 or an information-processing apparatus used as a client in the configuration of the network 100 shown in FIG. 1.

By execution of programs stored in a storage medium such as a ROM (Read Only Memory) 202 or an HDD (Hard Disk Drive) 204, a CPU (Central Processing Unit) 201 is capable of carrying out various kinds of processing so as to function as a data-processing unit or a communication-control-processing unit. A RAM (Random Access Memory) 203 is used for appropriately storing a program being executed by the CPU 201 and storing data. As shown in the figure, the CPU 201, the ROM 202, the RAM 203 and the HDD 204 are connected to each other through a bus 205.

The bus 205 is also connected to an input/output interface 206. The input/output interface 206 is connected to an input unit 207 and an output unit 208. The input unit 207 comprises a keyboard, switches, buttons and a mouse, which are operated by the user. On the other hand, the output unit 208 comprises an LCD, a CRT and a speaker, which are used for displaying and outputting various kinds of information to the user. The input/output interface 206 is also connected to a communication unit 209 and a drive 210. The communication unit 209 functions as a data transmission/reception unit. On the other hand, the drive 210 is a component for reading out data from a removable recording medium 211 and writing data onto the removable recording medium 211. Examples of the removable recording medium 211 are a magnetic disk, an optical disk, a magneto-optical disk and a semiconductor memory.

The configuration shown in FIG. 2 is a typical configuration of the server 101 or a PC serving as an apparatus connected to the network 100 shown in FIG. 1. However, apparatus connected to the network 100 are not limited to PCs. That is to say, as shown in FIG. 1, the apparatus can be a mobile phone, a portable communication terminal such as a PDA and various kinds of other electronic equipment such as a reproduction apparatus and a display apparatus or an information-processing apparatus. Each of the apparatus connected to the network 100 can have its unique hardware configuration and carries out processing conforming to the hardware.

Figure 3:
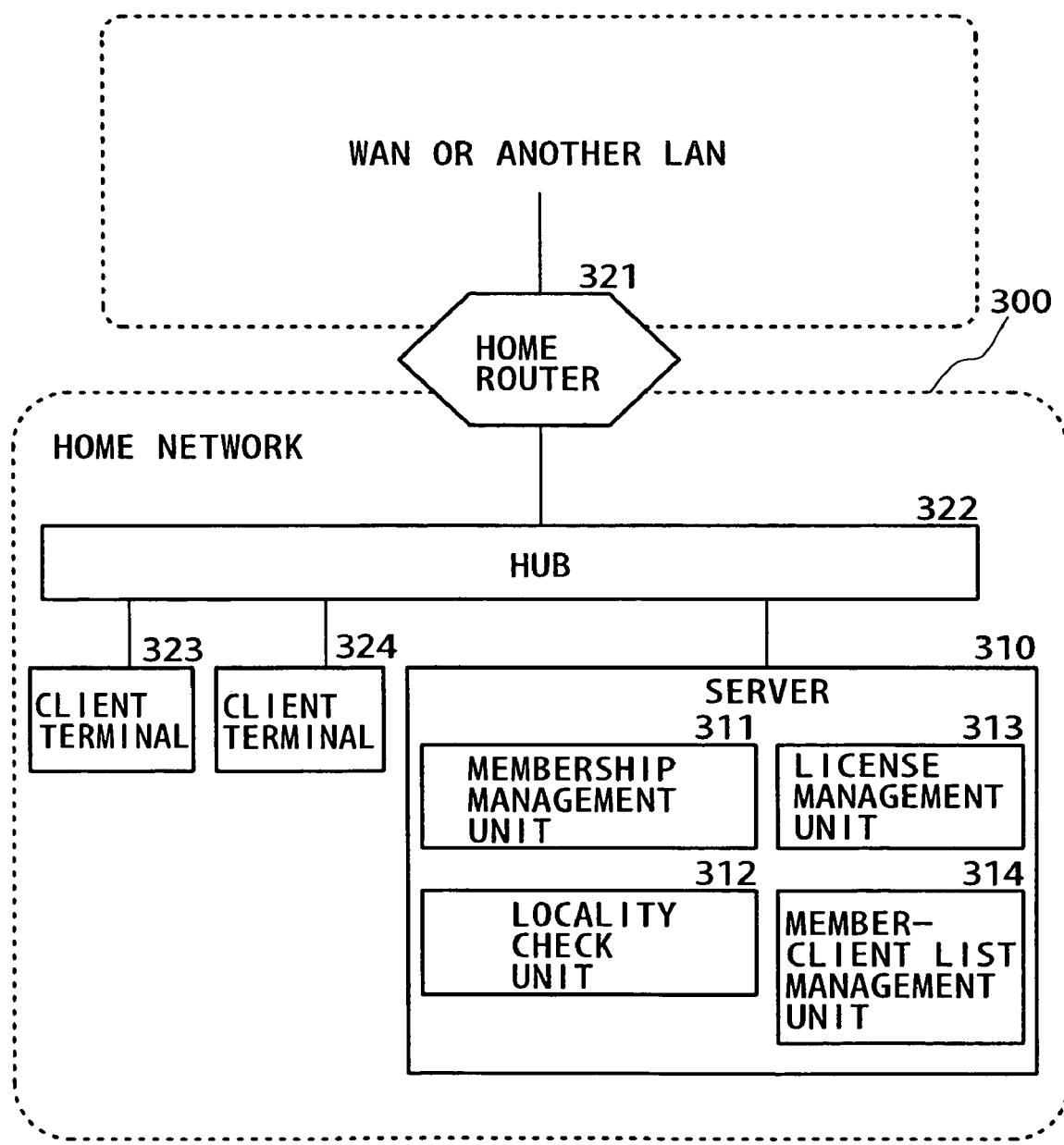
FIG. 3 is an explanatory diagram showing a typical configuration of a home network.

FIG. 3 is a diagram showing a model of the configuration of a home network 300 implemented by an embodiment of the present invention.

As shown in the figure, the home network 300 built at a home is connected to a WAN such as the Internet or another LAN through a home router 321. A default gateway of the home network 300 is set at the home router 321.

The home network 300 is built from a hub 322 and LAN cables connecting the hub 322 to host apparatus such as a home server 310 and client terminals 323 and 324.

The host apparatus such as the home server 310, the client terminals 323 and 324 and the home router 321 in the home network 300 and host apparatus of an external network each have a MAC address unique to the apparatus. A host apparatus exchanges a packet such as an Ethernet (a trademark) frame with another host apparatus by way of networks. The packet includes head information comprising the MAC addresses of the packet sender and the packet recipient.

Typically, the host apparatus such as the home server 310, the client terminals 323 and 324 and the home router 321 in the home network 300 are each an apparatus conforming to the UPnP. In the case of an apparatus conforming to the UPnP, the apparatus can be added to and removed from the home network 300 with ease. As described above, an apparatus newly added to the home network 300 can receive a service such as a content utilization service rendered in the home network 300 by execution of a procedure comprising (1) addressing processing, (2) discovery processing and (3) service request processing.

In the home network 300, a local environment is created. In this local environment, utilization of contents for private use or in the domain of home use is assumed. Thus, the home server 310 legitimately acquires a content from a content server on an external network through the home router 321 and stores the content for later distribution. Then, each of the client terminals 323 and 324 is allowed to request the home server 310 to transmit a desired content and utilize the acquired content.

In the local environment, each of the client terminals 323 and 324 acquires a content from the home server 310 and utilizes the content by, for example, copying or streaming the content. Each of the client terminals 323 and 324 is also capable of taking the acquired content out to the outside of the local environment. For example, each of the client terminals 323 and 324 is allowed to take the acquired content out to a remote environment.

The home server 310 comprises a membership management unit 311, a locality check unit 312, a license management unit 313 and a member-client list management unit 314. When the home server 310 receives a request from a client as a request to transmit a content managed by the home server 310 to the client or a request to register the client to serve as a member client, the home server 310 checks the client by determining whether or not the client pertains to the home network 300. That is to say, the locality check unit 312 checks locality of the client by determining whether or not the client pertains to the home network 300. If the home server 310 determines that the client pertains to the home network 300, the home server 310 processes the request. If a request is received from an external request maker through the home router 321, the request is turned down.

Processing carried out by the locality check unit 312 to check locality of the client is explained as follows. Before starting a service to distribute a content, the home server 310 acquires the MAC address of a default gateway in advance from the home router 321. In this embodiment, the MAC address of the default gateway is the MAC address of the home router 321.

The locality check unit 312 employed in the home server 310 receiving a request for an access fetches the MAC address of a client making the request from a packet received from the client as a packet containing the request. The locality check unit 312 then compares the fetched MAC address with the MAC address of the default gateway, that is, the MAC address previously acquired by the home server 310 itself. If the access has been made by a client connected to the home network 300, the MAC address fetched from the packet is the MAC address of a client making the request. If the access has been made by an access maker outside the network 100 through the home router 321, on the other hand, a MAC address included in the packet as the MAC address of the access maker is replaced with the MAC address of the home router 321 serving as the default gateway in the course of the packet transmission. Thus, if the fetched MAC address is found the same as the previously acquired MAC address of the default gateway, the access is determined to be an access made by an external access maker. If the fetched MAC address is found different from the previously acquired MAC address of the default gateway, on the other hand, the access is determined to be an access made by an internal access maker connected to the home network 300.

In this way, the home server 310 is capable of easily determining whether or not a client making a request is located in the home network 300, that is, the local environment. If the client making a request is located in the local environment, the requested content is transmitted to the client and a license including information on a limit on the content utilization is issued to the client. If the client making a request is located outside the local environment, on the other hand, the request is turned down. Thus, only a client located in a local environment created in this way is correctly allowed to utilize a content. As a result, illegal distribution of contents can be suppressed effectively.

The processing carried out by the locality check unit 312 to check locality of a client does not have to be carried out in the way described above. That is to say, another method can be adopted. For example, secret information shared by apparatus in the home network 300 is set and included in a packet exchanged between the apparatus. Then, the home server 310 receiving a packet compares secret information included in the packet with the secret information held by the home network 300 itself. If the secret information included in the packet matches its own secret information, the packet is determined to be a packet transmitted by an apparatus in the home network 300. As the secret information shared by apparatus in the home network 300, typically, the MAC address of the home router 321 is used. As an alternative, secret information stored in a local-environment management apparatus provided in the home network 300 or the MAC address of the local-environment management apparatus can be used.

Typical concrete processing is explained as follows. Before each of the client terminals 323 and 324 makes an access to the home server 310, for example, first of all, the client terminal acquires the MAC address of the default gateway from the home router 321 as secret information shared by apparatus in the home network 300. Then, the client terminal writes the acquired MAC address into a packet of a request for the access and transmits the packet to the home server 310. Receiving the packet, the home server 310 compares the secret information included in the packet, that is, the MAC address of the default gateway, with secret information held by the home server 310 itself. If the secret information included in the packet matches the secret information held by the home server 310 itself, the received packet is determined to be a packet transmitted by a client terminal in the home network 300.

The membership management unit 311 employed in the home server 310 executes management of membership of clients on the basis of a list of member clients. The list of member clients is a list of apparatus each connected to the home network 300 as an apparatus having a right to acquire a content. The list of member clients is managed by the member-client list management unit 314. In actuality, the list of member clients is a list of identifiers each identifying an apparatus connected to the home network 300 as a client having a right to acquire a content.

Figure 4:
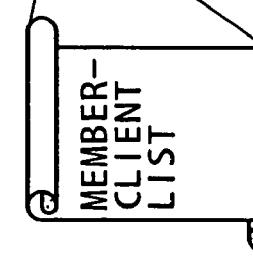
FIG. 4 is an explanatory diagram showing a member-client list held by a server, which is a typical information-processing apparatus provided by the present invention.

FIG. 4 is a diagram showing a typical list of member clients as a member-client list managed by the member-client list management unit 314. As shown in FIG. 4, the list of member clients comprises a plurality of lines each provided for an apparatus already serving as a member client, which is a client allowed to utilize a content managed by the home server 310. Each line of the member-client list includes a name identifying the apparatus, an ID assigned to the apparatus and information on an allowed member removal time at which the apparatus already serving as a member client can be removed. It is to be noted that, as shown in the figure, the name of an apparatus is an apparatus name that can be recognized by the user with ease. Examples of the apparatus name are a living-room PC and a dining-room TV. The name of an apparatus is optional information though.

An apparatus ID assigned to an apparatus is an ID unique to the apparatus. The MAC address of an apparatus is a typical ID assigned to the apparatus. It is to be noted that the server 310 acquires the MAC address of an apparatus from the apparatus in a process carried out by the server 310 to register the apparatus as a member client on the list of member clients.

It is also to be noted that a detailed sequence of a member registration will be described later.

The member-removal time information indicating a member removal time at which the apparatus already serving as a member client can be removed is typically the latest date among dates each indicating a validity limit of a content provided to the apparatus. When the home server 310 provides or outputs a content to a member client, the client stores the content and a license for the content in typically a hard disk or a flash memory employed in the client terminal as a storage unit. In the license, a condition for utilizing the content is set. An example of the condition is information on a time limit of the content utilization.

A member client is allowed to utilize a content till a time limit set for the content. As a validity time period set by the time limit of the content utilization expires, the member client is allowed to update the time limit or again acquire the content by making an access to the home server 310. However, a client, which has a content with a validity time period not expired yet but gave up its membership, should not be allowed to utilize the content due to the lost membership. This is because it is feared that, for example, a client no longer pertaining to a particular home network deviates from the normal private utilization of a content. That is to say, it is feared that the client utilizes a content by deviation from Article 30 of the copyright law, which states: "An operation to copy a content is allowed if the copying operation is carried out for the purpose of using the copy in a limited domain of private use, use at a home or the like."

In order to avoid such utilization of a content, when the home server 310 receives a request for termination of membership from a client, a license management unit 313 employed in the home server 310 refers to the list of member clients in carrying out a license check process to determine whether or not the validity time period of contents provided to the client has expired. If the validity time period of contents provided to the client has not expired yet, the termination of the membership is not permitted or a process to request the client to return the contents is carried out.

As described above, the server 310 carries out a process to terminate the membership of a client after confirming that the validity time period of contents provided to the client has expired. It is to be noted that a detailed sequence to remove a member of the list of member clients will be described later.

It is to be noted that, as shown in FIG. 4, the upper limit on the number of member clients than can be registered on the list of member clients is set in advance at N, where N is typically 5, 10, 15, 63 or another number. A new client can always be registered on the list of member clients as long as the number of member clients actually cataloged on the list has not reached the upper limit N.

Figure 5:
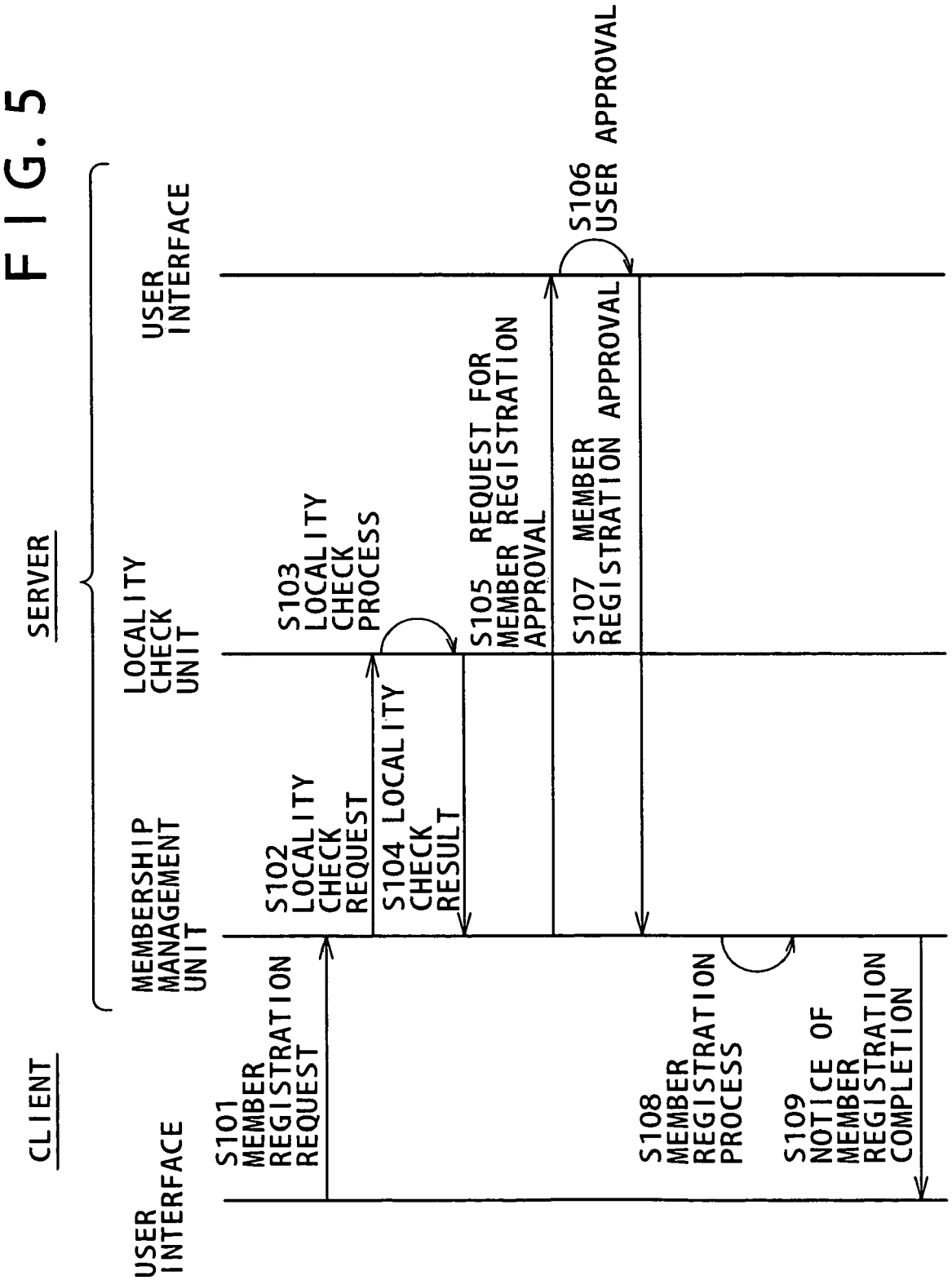
FIG. 5 is an explanatory diagram showing a sequence of processes to register a client to serve as a member client.

Next, a process to register a member client on the list is explained. FIG. 5 is a diagram showing a sequence of processes to register a member client on the list of client members.

From the left side, FIG. 5 shows processes carried out by a client making a request to register the client itself to serve as a member client on the list of member clients and processes carried out by a server for processing the request received from the client. The processes carried out by the server comprise processes performed by the membership management unit, the locality check unit and a server-side user interface.

First of all, when the user enters a request for a process to register the client to serve as a member client on the list of member clients via a client-side user interface, at a step S101, the client passes on the request to the server. The request for a process to register the client to serve as a member client on the list of member clients is transmitted by carrying out a process to transmit a packet including the identifier (ID) of the client. It is to be noted that the MAC address of the client can be used as the client ID.

Then, at the following step S102, in the server, the membership management unit requests the locality check unit to carry out a locality check process to check locality of the client. Subsequently, at the next step S103, the locality check unit carries out the locality check process to check locality of the client and, at the following step, the locality check unit reports a result of the locality check process to the membership management unit.

The locality check process of the locality check unit is carried out by execution of the same procedure as a locality check process for a request made by a client as a request for a content as will be described later.

To put it in detail, at the step S103, the locality check unit fetches the MAC address of a transmission originator from a request packet received from the client and compares the fetched MAC address with a MAC address acquired in advance by the server and stored in the server as the MAC address of the default gateway. If an access is made by a client of the same network, the MAC address included in the packet of the access as the MAC address of the access maker remains unchanged as it is. If an access is made by a client outside the network through a router, on the other hand, the MAC address included in the packet of the access as the MAC address of the access maker is replaced with the MAC address of the default gateway, which is the router, in the course of the packet transmission. Thus, by comparing the MAC address fetched from the packet with a MAC address acquired in advance by the server and stored in the server as the MAC address of the default gateway, the locality check unit is capable of determining whether the client making the access is a client of the same network, that is, a client in the same environment, or a client outside the network. As an alternative, the locality check unit carries out the locality check process by comparison of common secrete information included in the packet with common secrete information stored in advance in the server instead of comparing MAC addresses.

At the next step S104, the locality check unit reports a result of the locality check process carried out at the step S103 to the membership management unit. If the locality check unit determines that the client making the request to register the client is not a client of the same network, that is, not a client in the same environment, the execution of the sequence of processes is ended without registering the client to serve as a member client on the list of member clients. Note that, in this case, it is also possible to provide a configuration in which the membership management unit transmits a message indicating that the process to register the client is impossible to the client.

If the locality check unit determines that the client making the request to register the client is a client of the same network, that is, a client in the same environment, on the other hand, the flow of the sequence of processes goes on to a step S105 at which the membership management unit requests the server-side user interface to output a request for an approval of an operation to register the client to serve as a member client on the list of member clients. To put it concretely, the server-side user interface is requested to display a user-input request screen on a display unit to the user of the server as a screen requesting the user to enter an input indicating an approval or a disapproval of an operation to register the client to serve as a member client on the list of member clients.

As the user enters an input indicating an approval of an operation to register the client to serve as a member client on the list of member clients at the next step S106, the flow of the sequence of processes goes on to a step S107 at which the server-side user interface passes on the approval to the membership management unit. If the user does not enter an input indicating an approval of an operation to register the client to serve as a member client on the list of member clients at the step S106, on the other hand, the execution of the sequence of processes is ended without registering the client to serve as a member client on the list of member clients. Note that, in this case, it is also possible to provide a configuration in which the membership management unit transmits a message indicating that the process to register the client to serve as a member client cannot be carried out to the client.

If the server-side user interface passes on the approval to the membership management unit at the step S107, the flow of the sequence of processes goes on to a step S108 at which the membership management unit registers the client to serve as a member client on the list of member clients. That is to say, a process is carried out to add an entry describing information on the client to the member-client list described earlier by referring to FIG. 4. It is to be noted that, as explained earlier, the list of member clients has an upper limit on the number of member clients that can be registered on the list. The membership management unit registers the client to serve as a member client on the list of member clients only if the number of member clients actually cataloged on the list has not reached the upper limit. If the number of member clients actually cataloged on the list has reached the upper limit, on the other hand, the membership management unit does not register the client to serve as a member client on the list of member clients.

As the process carried out at the step S108 to register the client to serve as a member client on the list of member clients is completed, the flow of the sequence of processes goes on to a step S109 at which the membership management unit transmits a message to the client as a message informing the client that the process to register the client to serve as a member client on the list of member clients has been completed, and the processing is ended.

As described above, the server verifies the following two things:
(1): locality of the client, that is, the fact that the client is connected to the same home network as the server, and
(2): a clear approval given by the user of the server as an approval of an operation to register the client to serve as a member client on the list of member clients.

The server carries out the operation to register the client to serve as a member client on the list of member clients on condition that the above two things have been verified. Thus, a client is prevented from being registered to serve as a member client on the list of member clients in accordance with a request to register the client on the basis of an access made by a request maker outside the same home network of the server, or prevented from being registered to serve as a member client on the list of member clients without a clear approval given by the user of the server. As a result, strict management of membership can be executed. In addition, utilization of a content is limited to clients connected to the same network as the server so that illegal utilization of the content can be avoided.

Next, processing to delete a client already serving as a member client from the list of member clients is explained. FIG. 6 is a diagram showing the processing to delete a client already serving as a member client from the list of member clients.

From the left side, FIG. 6 shows processes carried out by a client making a request to delete the client itself as a member client from the list of member clients and processes carried out by a server for processing the request received from the client. The processes carried out by the server include processes performed by the membership management unit, the license management unit and a server-side user interface.

First of all, when the user enters a request for a process to deregister the client already serving as a member client from the list of member clients via a client-side user interface, at a step S201, the client passes on the request to the server. The request for a process to deregister the client already serving as a member client from the list of member clients is transmitted by carrying out a process to transmit a packet including the identifier (ID) of the client. It is to be noted that the MAC address of the client can be used as the client ID.

Then, at the following step S202, in the server, the membership management unit requests the license management unit to carry out a license validity period check process to check the license of the client by checking the validity period of the license. Subsequently, at the next step S203, the license management unit carries out the license validity period check process to check the license of the client and, at the following step, the license management unit reports a result of the license validity period check process to the membership management unit.

The license validity period check process of the license management unit is carried out on the basis of the list of member clients explained earlier by referring to FIG. 4.

As explained earlier by referring to FIG. 4, the list of member clients includes a plurality of lines each provided for an apparatus serving as a member client, which is a client allowed to utilize a content managed by the server 310. Each line of the member-client list includes a name identifying the apparatus, an ID assigned to the apparatus and information on an allowed member removal time at which the apparatus serving as a member client can be deleted. The member removal time information indicating a member removal time at which the apparatus serving as a member client can be deleted is typically the latest date among dates each indicating a validity limit of a content provided to the apparatus. When the server 310 carries out a process to provide a content to a member client, the server 310 also provides a license to the member client as well. In the license, a condition for utilizing the content is set. An example of the condition is information on a time limit of the content utilization. In this process, the information on a time limit of the content utilization is stored in the list of member clients as the allowed member removal time.

Note that it is possible to provide a configuration in which the allowed member removal time stored in the list of member clients includes the time limit of the content utilization for each content. As an alternative, it is possible to provide a configuration in which the allowed member removal time stored in the list of member clients includes only the latest date among dates each indicating a validity limit of a content provided to the client. When the license management unit employed in the server 310 transmits a content to a client, the license management unit refers to the allowed member removal time stored in the list of member clients as the allowed member removal time for the content and, if necessary, updates the allowed member removal time stored in the list of member clients. In this way, the allowed member removal time stored in the list of member clients includes at least the latest date among dates each indicating a validity limit of a content provided to the client.

As described above, at the next step S203, the license management unit carries out the license validity period check process to check the license of the client by determining whether or not the client making a request for deletion of the client already serving as a member client is a client having no license with a remaining validity time period. That is to say, the license management unit extracts an entry of the client making a request for deletion of the client already serving as a member client from the list of member clients and examines the allowed member removal time stored in the extracted entry to determine whether or not the validity time periods of all contents provided to the client have expired. If the license management unit determines that the validity time periods of all contents provided to the client making a request for deletion of the client already serving as a member client have expired, the client already serving as a member client is determined to be a client that can be deleted. Then, at the next step S204, the license management unit informs the membership management unit that the client making a request for deletion of the client is a client that can be deleted. If the license management unit determines that the validity time periods of contents provided to the client making a request for deletion of the client already serving as a member client have not all expired, on the other hand, the client already serving as a member client is determined to be a client that cannot be deleted. In this case, at the step S204, the license management unit informs the membership management unit that the client making a request for deletion of the client is a client that cannot be deleted.

If the license management unit finds out that the validity time periods of contents provided to the client making a request for deletion of the client already serving as a member client have not all expired, determining that the client already serving as a member client is a client that cannot be deleted and, at the step S204, the license management unit informs the membership management unit that the client making a request for deletion of the client is a client that cannot be deleted, the membership management unit informs the client making a request for deletion of the client already serving as a member client that the client cannot be deleted. As an alternative, the membership management unit requests the client making a request for deletion of the client already serving as a member client to return contents provided to the client.

If the license management unit finds out that the validity time periods of contents provided to the client making a request for deletion of the client already serving as a member client have all expired, determining that the client already serving as a member client is a client that can be deleted and, at the step S204, the license management unit informs the membership management unit that the client making a request for deletion of the client is a client that can be deleted, on the other hand, the flow of the sequence of processes goes on to a step S205 at which the membership management unit requests the server-side user interface to output a request for an approval of an operation to delete the client already serving as a member client from the list of member clients. To put it concretely, the server-side user interface is requested to display a user-input request screen on a display unit to the user of the server as a screen requesting the user to enter an input indicating an approval or a disapproval of an operation to delete the client already serving as a member client from the list of member clients.

As the user enters an input indicating an approval of an operation to delete the client already serving as a member client from the list of member clients at the next step S206, the flow of the sequence of processes goes on to a step S207 at which the server-side user interface passes on the approval to the membership management unit. If the user does not enter an input indicating an approval of an operation to register the client already serving as a member client on the list of member clients at the step S206, on the other hand, the execution of the sequence of processes is ended without deleting the client already serving as a member client from the list of member clients. Note that, in this case, it is also possible to provide a configuration in which the membership management unit transmits a message indicating that the process to delete the client already serving as a member client cannot be carried out to the client.

If the server-side user interface passes on the approval to the membership management unit at the step S207, the flow of the sequence of processes goes on to a step S208 at which the membership management unit deletes the client already serving as a member client from the list of member clients. That is to say, a process is carried out to delete an entry describing information on the client from the member-client list described earlier by referring to FIG. 4.

As the process carried out at the step S208 to delete the client already serving as a member client on the list of member clients is completed, the flow of the sequence of processes goes on to a step S209 at which the membership management unit transmits a message to the client as a message informing the client that the process to delete the client already serving as a member client from the list of member clients has been completed.

As described above, the server verifies the following two things:

(1): expiration of the validity time periods of all contents provided to the client making a request for deletion of the client already serving as a member client, and (2): a clear approval given by the user of the server as an approval of an operation to delete the client already serving as a member client from the list of member clients.

The server carries out the operation to delete the client already serving as a member client from the list of member clients on condition that the above two things have been verified. Thus, if the client making a request for deletion of the client already serving as a member client is a client having a license with a remaining validity time period of a content provided by the server, the client is prevented from being deleted from the list of member clients or, even if the client making a request for deletion of the client already serving as a member client is a client having no license with a remaining validity time period of a content provided by the server, the client is also prevented from being deleted as a member client from the list of member clients unless a clear approval is given by the user of the server. As a result, utilization of a content is limited to member clients recognized by the server so that illegal utilization of the content can be avoided.

The hardware configurations of the server and a client apparatus have been explained by referring to FIG. 2. The various kinds of processing described above are carried out by the CPUs employed in the server and the client apparatus as control units through execution of programs stored in advance in storage units employed in the server and the client apparatus respectively.

Typical pieces of processing carried out by the CPU employed in the server include a process to receive a request from a client as a request for registration of the client to serve as a member client or a request for deletion of the client already serving as a member client. In accordance with the received request, the server then carries out processing including a process to check locality of the client, a process to obtain an approval of the registration or the deletion of the client from the user of the server, and a process to update the list of member clients.

Basically, these pieces of processing are carried out by the CPU employed in the server as a control unit through execution of processing programs stored in advance in storage unit employed in the server. The pieces of processing carried out by the CPU employed in the server as a control unit and pieces of data stored in the storage unit employed in the server are explained by referring to FIG. 7. FIG. 7 is an explanatory block diagram showing a configuration including main functional elements of the server.

A packet transmission/reception unit 701 is an element for exchanging a packet with a client serving as a communication partner. A packet generation/analysis unit 702 is an element for generating a packet to be transmitted and analyzing a received packet. To be more specific, the packet generation/analysis unit 702 carries out processing including operations to set an address of a generated packet, recognize an address of a received packet, store data into a data storage portion of a packet to be transmitted, and read out data from the data storage portion of a received packet.

A data input unit 703 includes a keyboard used by the user to enter data inputs and a user interface. A data output unit 704 is an output unit including a display unit for displaying message data or the like. The data output unit 104 displays the screen to request the user to enter an input indicating an approval of member registration or deletion.

A membership management unit 705 is an element for managing membership of clients. To put it in detail, the membership management unit 705 executes management of members on the basis of a member-client list 711 stored in a storage unit 709 in a format shown in FIG. 4.

The membership management unit 705 executes general control of the processing to register a client to serve as a member client as shown in FIG. 5 and the processing to delete a client already serving as a member client as shown in FIG. 6 only if predetermined conditions are satisfied.

The locality check unit 706 is an element for checking the locality of a client in the processing to register a client to serve as a member client as shown in FIG. 5. That is to say, the locality check unit 706 determines whether or not the client is located in the same home network as the server on the basis of the MAC address of a transmission source or on the basis of common secret information.

A license management unit 707 is an element for verifying that a client making a request for deletion of the client already serving as a member client is a client having no license with a remaining validity time period of a content provided by the server. To put it concretely, the license management unit 707 refers to an allowed member removal time stored in the list of member clients 711 stored in a storage unit 709 to determine whether or not the validity time periods of all contents provided to the client have expired.

A member-client list management unit 708 is an element for managing the member-client list 711.

The storage unit 709 is an element for storing the member-client list 711, data-processing programs 712, contents 713, which is utilizable by clients, and license information 714 for each of the contents 713. The data-processing programs 712 are programs prescribing the processing to register a client to serve as a member client as shown in FIG. 5 and the processing to delete a client already serving as a member client as shown in FIG. 6.

The server has functions shown as the functional blocks of FIG. 7. The server executes the data-processing programs 712 under control executed by the CPU employed in the server as shown in FIG. 2.

The present invention has been explained in detail so far by describing preferred embodiments. It is obvious, however, that a person skilled in the art is capable of modifying and/or replacing the embodiments within a range not departing from essentials of the present invention. That is to say, the embodiments are used merely to exemplify the present invention and should not be interpreted as limitations to the present invention. The essentials of the present invention are determined only by referring to the range of claims.

It is to be noted that a series of processes explained in this specification can be implemented by hardware, software or a combination of hardware and software. If the processing is implemented by software, a software program prescribing the sequence of the processing can be installed in a memory employed in a special-purpose computer embedded in dedicated hardware for later execution. As an alternative, the program to be executed is installed in a memory employed in a general-purpose computer capable of carrying out various kinds of processing.

The memory employed in the computer as a memory for installing the program is typically a hard disk. Instead of installing a program into a hard disk, the program can also be stored in advance in the hard disk. A program installed or stored in advance in the hard disk is then loaded into a RAM for execution by the CPU. Instead of using the hard disk for installing a program or storing the program in advance, the program can also be stored in advance in a ROM (Read Only Memory) in a state of being readily executable by the CPU. In general, a program is installed into a hard disk from a removable recording medium such as a flexible disk, a CD-ROM (Compact-Disk Read Only Memory), an MO (Magneto Optical) disk, a DVD (Digital Versatile Disk), a magnetic disk or a semiconductor memory. Thus, the program is stored (or recorded) in advance in the removable recording medium temporarily or permanently. A program stored (or recorded) in advance in the removable recording medium is presented to the user as the so-called package software.

It is to be noted that, instead of installing a program from a removable recording medium into a hard disk as described above, the program can also be downloaded from a download site to the computer through radio communication, or through wire communication by way of a network such as a LAN (Local Area Network) or the Internet. The computer receives the downloaded program and installs the program into a memory such as a hard disk.

It is also worth noting that various kinds of processing described in this specification can be carried out not only in a pre-prescribed order along the time axis, but also concurrently or individually in accordance with the processing power of an apparatus for carrying out the processing or in accordance with necessity. In addition, the technical term "system" used in this specification implies the configuration of a logical confluence comprising a plurality of apparatus, which are not necessarily accommodated in a single housing.

As described above, in accordance with a configuration of the present invention, a server carries out a process to register a client to serve as a member client on a list of member clients, which are each having a right to utilize a content, on condition that two results of confirmation indicate that a client making a request for registration of the client to serve as a member client is a client in the same local network as the server and indicate that a user of the server has given an approval of the requested registration of the client to serve as a member client. Thus, the server turns down a request for registration of a client to serve as a member client on the list of member clients if the request is based on an access made by a client outside the same home network as the server or the request is not approved clearly by the user. As a result, strict management of members can be executed. In addition, the utilization of a content is limited to a client in the same local network as the server, and it is therefore possible to get rid of illegal utilization of a content.

In addition, in accordance with a configuration of the present invention, a server carries out a process to delete a client already serving as a member client from a list of member clients, which are each having a right to utilize a content, on condition that two results of confirmation indicate that the client making a request for deletion of the client already serving as a member client is a client having no license with a remaining validity time period and that a user of the server has given an approval of the requested deletion of the client already serving as a member client. Thus, the server turns down a request for deletion of a client already serving as a member client from the list of member clients if the request is based on an access made by a client having a license with a remaining validity time period or the request is not approved clearly by the user. As a result, strict management of members can be executed and the utilization of a content is limited to a member client recognized by the server, and it is therefore possible to get rid of illegal utilization of a content.

What is claimed is:

1. A content-utilization management server on a local network, the server comprising:
    a storage unit for storing a list of member clients having a right to use content; and
    a data-processing unit for:
        receiving a member registration request from a client;
        confirming whether the client is on the same local network as the server based on a media access control (MAC) address included in a packet received from the client;
        confirming whether a user of the server has given approval to allow the client to use the content; and
        registering the client on the list of member clients when it is confirmed that the client is on the same local network as the content-utilization management server and that the user has given the approval.

2. The content-utilization management server according to claim 1, wherein the data-processing unit determines whether the user has given an approval based on user input entered via a user interface.

3. A content-utilization management server, comprising:
    a storage unit for storing a list of member clients having a right to use content; and
    a data-processing unit for:
        receiving a request from a client to delete the client from the list of member clients;
        confirming whether the client has remaining time on a license to use the content;
        confirming whether a user of the server has given approval to allow the client to be deleted from the list of member clients; and
        deleting the client from the list of member clients when it is confirmed that the client has no remaining time on a license to use the content and that the user has given the approval.

4. The content-utilization management server according to claim 3, wherein:
    the list of member clients includes licenses to use the content granted to the member clients; and
    the data-processing unit includes a license management unit for determining whether the client has remaining time on a license to use the content based on a time limit on a license for the client included in the list of member clients.

5. The content-utilization management server according to claim 3, wherein the data-processing unit determines whether the user has given the approval based on user input entered via a user interface.

6. A method for registering a client on a list of member clients having a right to use content, the method comprising:
    receiving from the client a request to register the client as a member on the list of member clients;
    confirming whether the client is on the same local network as a server based on a media access control (MAC) address included in a packet received from the client;
    confirming whether a user of the server has given approval to the client to use the content; and
    registering the client on the list of member clients when it is confirmed that the client is on the same local network as the server and that the user has given the approval.

7. The method according to claim 6, wherein the approval is confirmed based on user input entered via a user interface.

8. A method for deleting a client from a list of member clients having a right to use content, the method comprising:
    receiving a request from the client to delete the client from the list of member clients;
    confirming whether the client has remaining time on a license to use the content;
    confirming whether a user of the server has given approval to allow the client to be deleted from the list of member clients; and
    deleting the client from the list of member clients when it is confirmed that the client has no remaining time on a license to use the content and that the user has given the approval.

9. The method according to claim 8, wherein:
    the list of member clients includes licenses to use the content granted to the member clients; and
    it is confirmed whether the client has remaining time on a license to use the content based on a time limit on a license for the client included in the list of member clients.

10. The method according to claim 8, wherein it is confirmed whether the user has given the approval based on user input entered via a user interface.

11. A computer-readable storage medium storing a computer program which, when executed by a server, causes the server to perform a method for registering a client as a member on a list of member clients having a right to use content, the method comprising:
    receiving from the client a request to register the client as a member on the list of member clients;
    confirming whether the client is on the same local network as the server based on a media access control (MAC) address included in a packet received from the client;
    confirming whether a user of the server has given approval to the client to use the content; and
    registering the client on the list of member clients when it is confirmed that the client is on the same local network as the server and that the user has given the approval.

12. A computer-readable storage medium storing a computer program which, when executed by a server, causes the server to perform a method for deleting a client from a list of member clients having a right to use content, the method comprising:

receiving a request from the client to delete the client from the list of member clients;
confirming whether the client has remaining time on a license to use the content;
confirming whether a user of the server has given approval to allow the client to be deleted from the list of member clients; and deleting the client from the list of member clients when it is confirmed that the client has no remaining time on a license to use the content and that the user has given the approval.

* * * * *